US006688786B2

(12) United States Patent
Brown et al.

(10) Patent No.: US 6,688,786 B2
(45) Date of Patent: Feb. 10, 2004

(54) APPARATUS AND METHOD FOR SUPPRESSING THE PRINTING OF NEARLY-BLANK PAGES

(75) Inventors: Mark Louis Brown, Boise, ID (US); Vincent C. Skurdal, Boise, ID (US); Shane Theodore Gehring, Meridian, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/179,688

(22) Filed: Jun. 24, 2002

(65) Prior Publication Data

US 2003/0235451 A1 Dec. 25, 2003

(51) Int. Cl.$^{7}$ .......................... B41J 11/36; G06F 15/00
(52) U.S. Cl. ........................................ 400/76; 358/1.13
(58) Field of Search ............................ 400/76, 61, 62, 400/63, 582, 578, 605, 629; 271/291, 301; 358/1.1, 1.13, 1.16, 1.18, 1.12

(56) References Cited

U.S. PATENT DOCUMENTS 4,071,910 A * 1/1978 Stockebrand et al. ........ 345/1.1
4,362,379 A * 12/1982 Tiek et al. .................. 399/402
4,870,611 A * 9/1989 Martin et al. ............... 715/526
4,924,275 A * 5/1990 Nelson ........................ 399/401
5,758,049 A 5/1998 Johnson
5,832,235 A * 11/1998 Wilkes ........................ 709/247
5,889,594 A * 3/1999 Maekawa ................... 358/296
6,072,521 A * 6/2000 Harrison et al. .............. 725/81
2002/0122189 A1 * 9/2002 Salgado ...................... 358/1.6
2003/0013951 A1 * 1/2003 Stefanescu et al. ......... 600/407

* cited by examiner

*Primary Examiner*—Andrew H. Hirshfeld
*Assistant Examiner*—Hoai-An D. Nguyen
(74) *Attorney, Agent, or Firm*—David W. Boyd

(57) ABSTRACT

A system includes an operating mode in which the system detects requests to print nearly-blank pages and suppresses their printing. The detection and suppression may occur in a computer or other host device, in a printer, or in an intermediate device. A nearly-blank page may be identified in any of multiple ways. The mode may optionally be switched off so that nearly-blank pages are printed. The mode may optionally apply to only the last page in a print job.

13 Claims, 7 Drawing Sheets

APPARATUS AND METHOD FOR SUPPRESSING THE PRINTING OF NEARLY-BLANK PAGES

FIELD OF THE INVENTION

The present invention relates generally to printing.

BACKGROUND OF THE INVENTION

Many modern computer systems and other data processing systems include printers for making substantially permanent records of information. Typically, a printer responds to commands from a computer or other device and prints the requested information without regard to the efficiency of what is requested. For example, the computer or other device may occasionally request that a blank or nearly-blank page be "printed," and a blank or nearly-blank page results. Blank pages are pages with no printed content, and often result, for example, when a document file has unnecessary blank lines at its end.

Nearly-blank pages are pages that contain so little printed matter as to be of marginal utility. Such pages are a common result, for example, of printing from web browser software. Material placed on the World Wide Web is often formatted for viewing on a display screen rather than formatted for efficient printing. Printing a web page often results in pages that may contain a header or footer or both but no other content.

The printing of nearly-blank pages has several disadvantages. Time and resources are wasted in processing the pages. The pages are often not recycled, resulting in waste or added requirements for storage space. Even if the pages are reused for further printing, the wasted trip through the printer mechanism may introduce a degree of curl to the paper, increasing the likelihood that the paper will jam in the printer when it is reused.

Some systems may suppress the processing of blank pages, for example by discarding the second of two consecutive form feed commands. However, these systems do not address the waste and inefficiency caused by the processing of nearly-blank pages.

There is a need for an improvement in printing to reduce the waste and difficulties caused by the printing of nearly-blank pages.

SUMMARY OF THE INVENTION

A system includes an operating mode in which the system detects requests to print nearly-blank pages and suppresses their printing. The detection and suppression may occur in a computer or other host device, in a printer, or in an intermediate device. A nearly-blank page may be identified in any of multiple ways. The mode may optionally be switched off so that nearly-blank pages are printed. The mode may optionally apply to only the last page in a print job.

DETAILED DESCRIPTION OF THE PREFERRED EMBODIMENT

Figure 1:
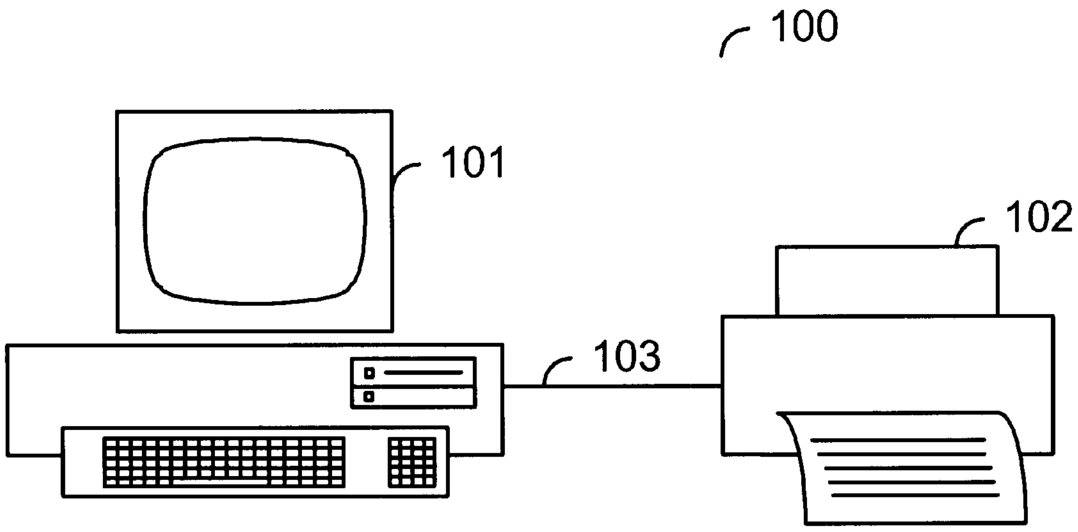
FIG. 1 depicts a typical example of a data processing system.

FIG. 1 depicts a typical example data processing system 100, comprising a host device 101 communicating with a printer 102. In this example embodiment, the host device 101 is a computer, although the present invention may be embodied in systems with other host devices. For example a system may comprise a set-top box connected to a printer. A set-top box typically is placed on top of a television, and provides game-playing ability, internet access, interactive television functions, enhanced television viewing, or some combination of these capabilities. The communication link 103 to the printer may use a cable, or may be a wireless connection.

Figure 2:
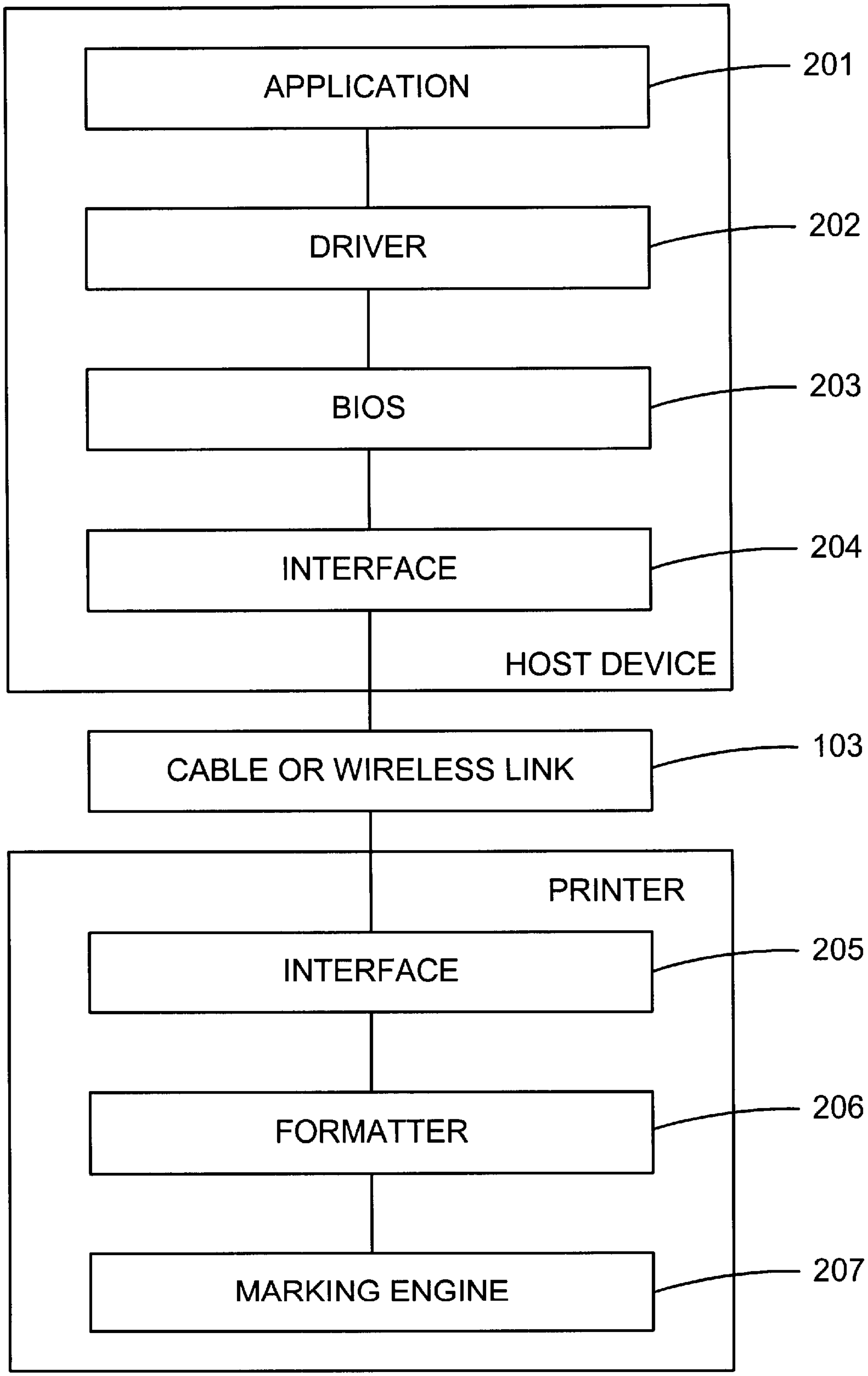
FIG. 2 depicts example steps that a typical print job may comprise.

FIG. 2 depicts example steps that a typical print job may comprise. In the example embodiment, application software 201 on the host device 101 is used to compose a page to be printed. The application software 201 may be a word processing program, a spreadsheet program, or another kind of application software. The page to be printed may be represented by data generated by the application software 201. For example, the application software 201 may describe the page using a page description language (PDL) such as Printer Command Language (PCL), developed by the Hewlett-Packard Company of Palo Alto, Calif., or PostScript, developed by Adobe Systems of San Jose, Calif. The application software 201 may use other data formats to describe the page as well, including characters from the American Standard Code for Information Interchange (ASCII) character set, or another format.

The application software 201 typically communicates its output data to a device driver 202, which is another software program resident on the host device 101. The device driver 202 may be a standard part of an operating system, or may be installed specifically for the operation of printer 102. A device driver 202 typically adds control information and the like to the data generated by the application software 201.

The device driver 202 may send the data to a basic input/output system (BIOS) 203 resident on the host device. The BIOS 203 is another program, and may reside in volatile or nonvolatile memory. The BIOS 203 provides low-level functions for communicating with hardware interfaces built into host device 101.

The BIOS 203 may send the data through an interface 204. Interface 204 may be a parallel connection or serial connection, and may be a Centronics, RS-232, USB, or IEEE 1394 "Firewire" interface, or another kind of interface.

Interface 204 may transmit the data outside the host device via a communication link 103, which may be a cable or wireless connection.

Printer 102 may comprise a second interface 205 similar to interface 204 on host device 101. The second interface 205 accepts data from communication link 103 into printer 102. Printer 102 may be a laser printer, inkjet printer, daisy wheel printer, dot matrix printer, line printer, page printer, or another kind of printer.

Printer 102 may also typically comprise a formatter 206. A formatter is a combination of hardware and software or firmware that converts the data sent to printer 102 from host device 101 into the electrical control signals necessary to cause printer 102 to print a page in accordance with the description created by application software 201.

Formatter 206 may send signals to a marking engine 207. A marking engine is the electromechanical mechanism that creates the required image on paper in response to signals from formatter 206. The marking engine 207 may place ink, toner, wax, dye, or another medium on selected parts the paper, or may modify parts of the paper with heat, light, or by some other means in order to create an image.

Figure 3:
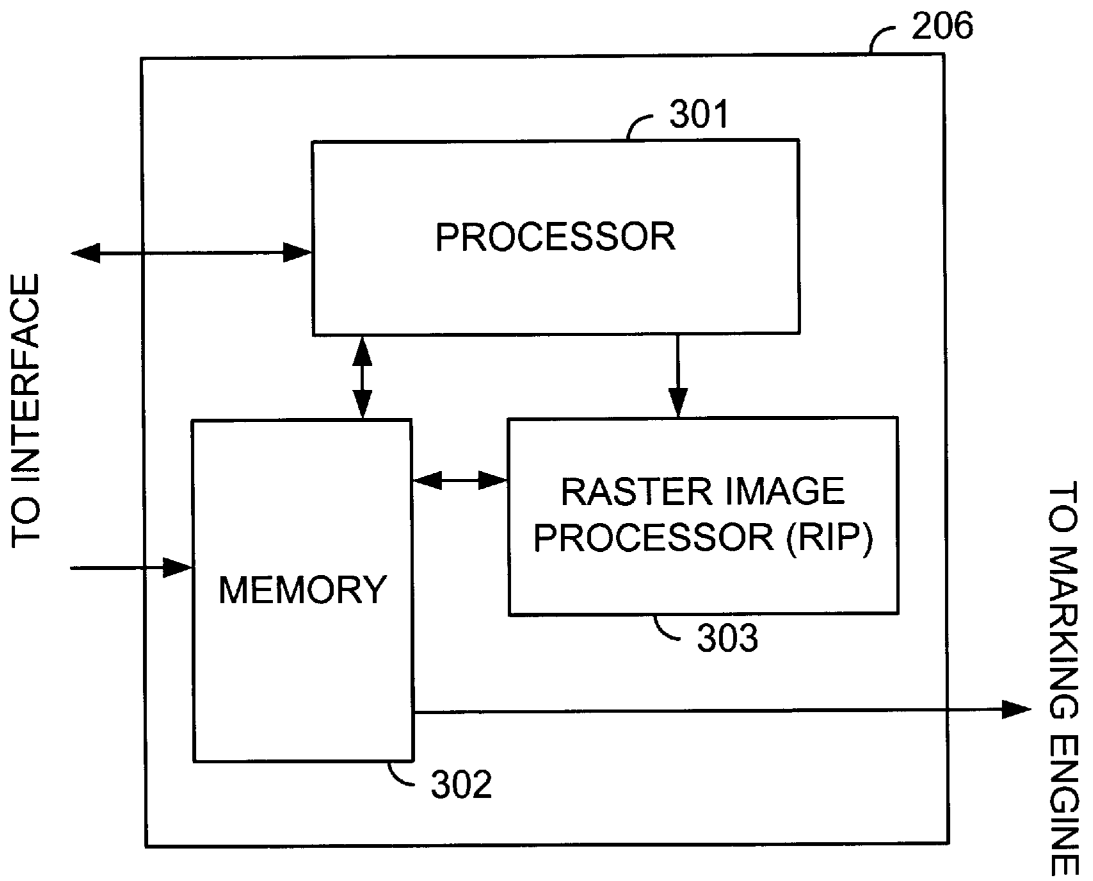
FIG. 3 depicts a simplified schematic diagram of an example formatter.

FIG. 3 depicts a simplified schematic diagram of an example formatter 206. The formatter may comprise one or more processors 301 that communicate with the host device, manage data flow in the formatter, and control the marking engine. The formatter may further comprise memory 302, for storing programs and data used by the processor 301, for holding the data received from the host device 101, and for holding intermediate representations of pages as necessary. Memory 302 may comprise both volatile and nonvolatile types of memory.

The formatter may optionally further comprise a raster image processor (RIP) 303. A raster image processor may be a combination of hardware and software or firmware that constructs a bitmapped representation of the requested page using the data from host device 101. A bitmapped representation assigns locations in memory 302 to locations on the page, and stores in each memory location an indication of whether or not that particular location on the page is to receive any marking.

Raster image processor 303 is shown as residing in printer 102 for purposes of illustration, and this is a common configuration. Alternatively, the raster image processor may reside in the host device 101, and may be implemented in device driver 202 or even in application software 201. Still other configurations are possible within the scope of the present invention.

Figure 4:
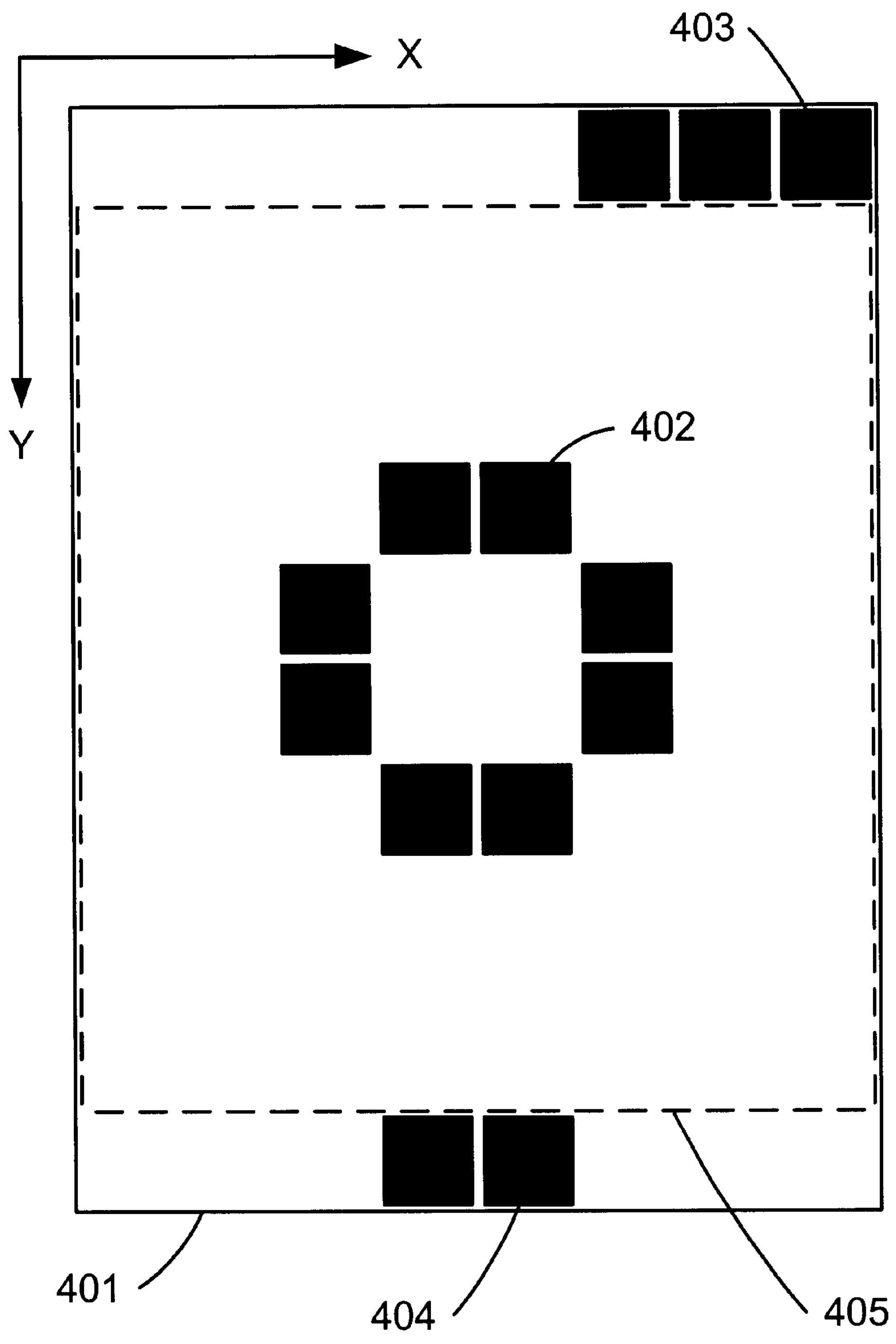
FIG. 4 depicts a simplified representation of an example printed page.

FIG. 4 depicts a simplified representation of an example printed page 401. In this highly simplified example, page 401 comprises 88 locations called "pixels", or "dots." An actual printed page may contain thousands or millions of dot locations, depending on the resolution of the particular printer. One of ordinary skill in the art will recognize that the principles described will apply to pages of higher resolution than example page 401.

On example page 401, three main groups of marked dots are shown. A cluster of eight dots 402 near the center of the page may represent some desired printed content. Dot cluster 403, comprising three dots near the top of the page, may represent header information placed on the page, and dot cluster 404, comprising two dots near the bottom of the page, may represent footer information. Dashed boundary 405 represents a window boundary, selected by the printer when the printer is configured to suppress the printing of nearly-blank pages. The boundary may optionally be adjusted by the user through a software interface, front panel controls on the printer, or by other means. Window boundary 405 may be used to discriminate between pages that are nearly-blank and pages that are not nearly-blank. For example, pages with marked dots within window boundary 405 may be designated as not nearly-blank, and pages with no marking within boundary 405 may be designated as nearly-blank.

The dot locations represented on example page 401 may also be thought of as locations in a corresponding array of locations in memory 302. Each dot may correspond to a bit or group of bits in memory 302. A particular bit pattern may be stored in each memory location to represent a marked dot, and a different pattern may be stored to represent an unmarked dot. For example, marked dots may be represented by storing a digital "1" in each corresponding memory location, and unmarked dots may be represented by storing a digital "0," although many other systems are possible.

In a simple example embodiment, firmware or software running on processor 301 may examine the memory locations before a page is printed to see if any dots within boundary 405 are to be marked. An example pseudo-code implementation of this technique may be as follows:

Listing 1.

```
suppress_page_flag = NO
if suppression_mode = ON then
  y_top_boundary=1
  y_bottom_boundary=9
  x_left_boundary=0
  x_right_boundary=7
  near_blank_flag = YES
  for y=y_top_boundary to y_bottom_boundary
    for x=x_left_boundary to x_right_boundary
      if dot(x,y)=MARKED then near_blank_flag=NO
    next x
  next y
  if near_blank_flag=YES then suppress_page_flag=YES
end if
```

Example page 401 has markings inside window boundary 405, and thus would not be designated a nearly-blank page. After execution of the algorithm described in Listing 1 using data describing example page 401, suppress_page_flag will be NO, and page 401 will be printed.

Figure 5:
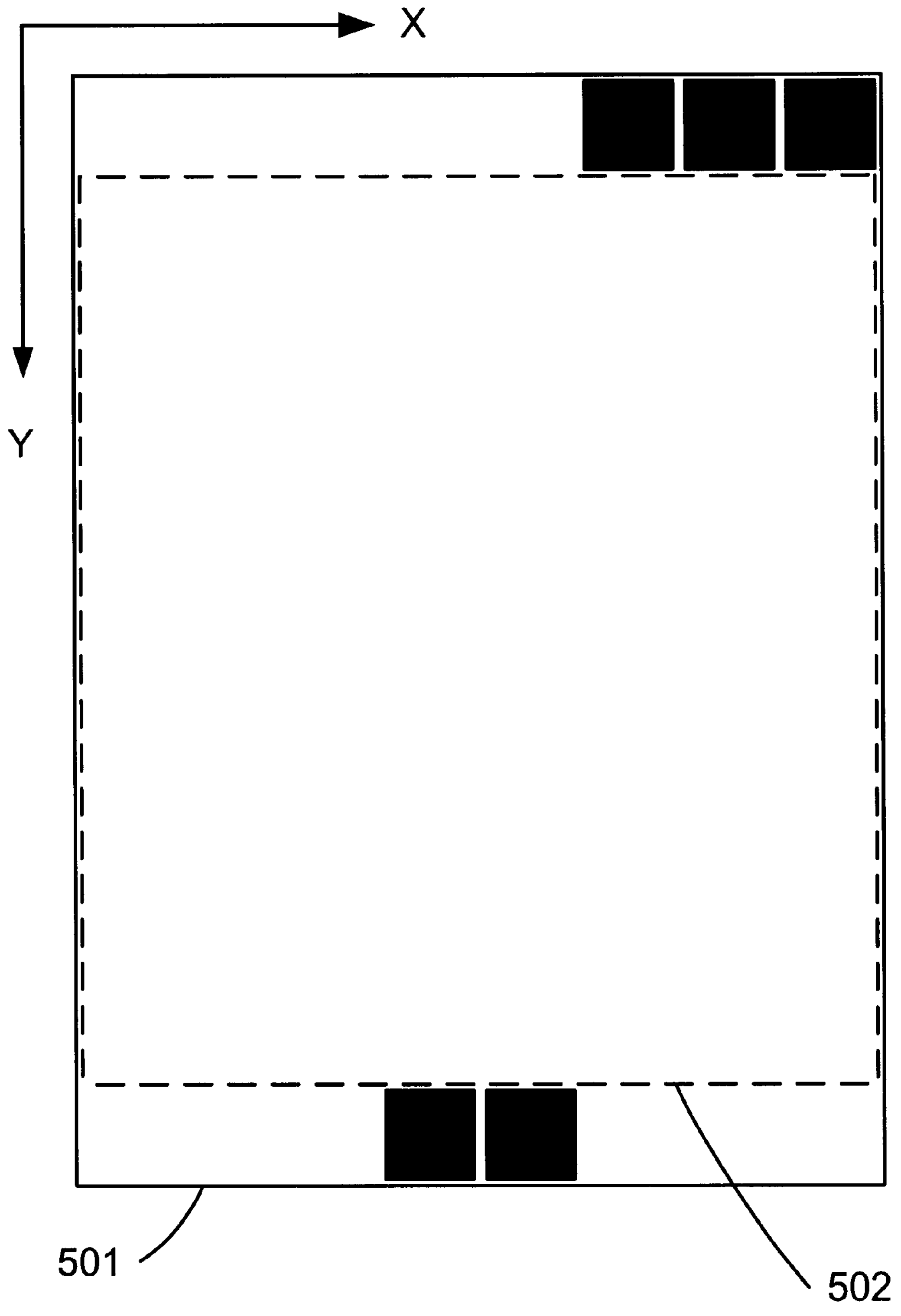
FIG. 5 depicts an example nearly-blank page.

If after execution of this algorithm suppress_page_flag=YES, then processor 301 may control the printer so as to skip or suppress the printing of the page. For example, FIG. 5 depicts an example nearly-blank page 501. Nearly-blank page 501 has marked dots only outside window boundary 502. Thus after execution of the algorithm in Listing 1, suppress_page_flag will be YES, and the printing of the page will be suppressed, assuming that the variable suppression_mode has been set to ON. The suppression may be accomplished by discarding the request to print the page.

The variable suppression_mode may be set by the user of data processing system 100, using a software interface, a front panel control, or by other means. In this way, the system may be configured to suppress the printing of nearly-blank pages, or to print them. Turning off nearly-blank page suppression may be desirable for providing proper pagination for formal documents or the like.

The algorithm in Listing 1 has been described as executing on processor 301 inside printer 102 for purposes of explanation. Other implementation methods are possible. For example, hardware in formatter 206 in printer 102 could perform a similar test as raster image processor 303 is forming a bitmapped representation of the page.

Alternatively, the algorithm of Listing 1 could be implemented in driver 202 in host device 101, or in application software 201.

Other algorithms and definitions of a nearly-blank page are possible as well. For example, in addition to having marked dots outside a window boundary, a page with a small number of dots to be marked within the window boundary could also be designated a nearly-blank page. With modern high-resolution printers, isolated marked dots on a page are very small and carry little information, so a page with only a few marked dots might safely be designated as nearly-blank. The number of marked dots to allow within the window boundary may be configurable.

It is not necessary within the scope of the invention that a bitmap image of the page be constructed. For example, a system that communicates simple ASCII character codes to the printer could buffer the codes and withhold printing of a page until examination of the codes indicates that one of the printed characters will fall within a window boundary. If a character inside a window boundary is detected, printing would be resumed. If an entire page is received without codes calling for a character to be printed within the window boundary, the page would be discarded without printing. The buffering and examination may happen in a host device or in the printer.

Figure 6:
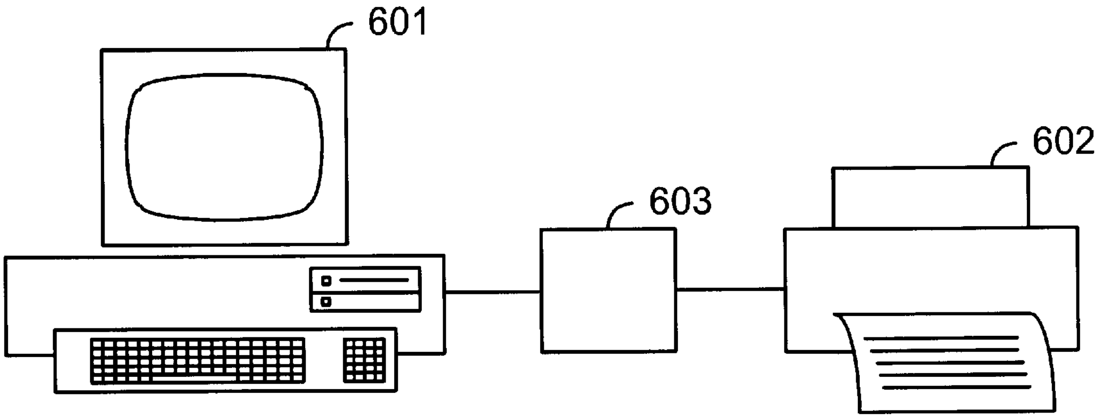
FIG. 6 depicts an example system using an intermediate device between a host device and a printer.

Any of these algorithms may also be implemented in an intermediate device between the host device and the printer. FIG. 6 depicts a data processing system using an intermediate device 603 between a host device 601 and a printer 602. Intermediate device 603 may intercept and relay data from host device 601 to printer 602, and may provide print job buffering, protocol translation, or other capabilities, including the configurable suppression of nearly-blank pages. Intermediate device 603 may modify the data.

Figure 7:
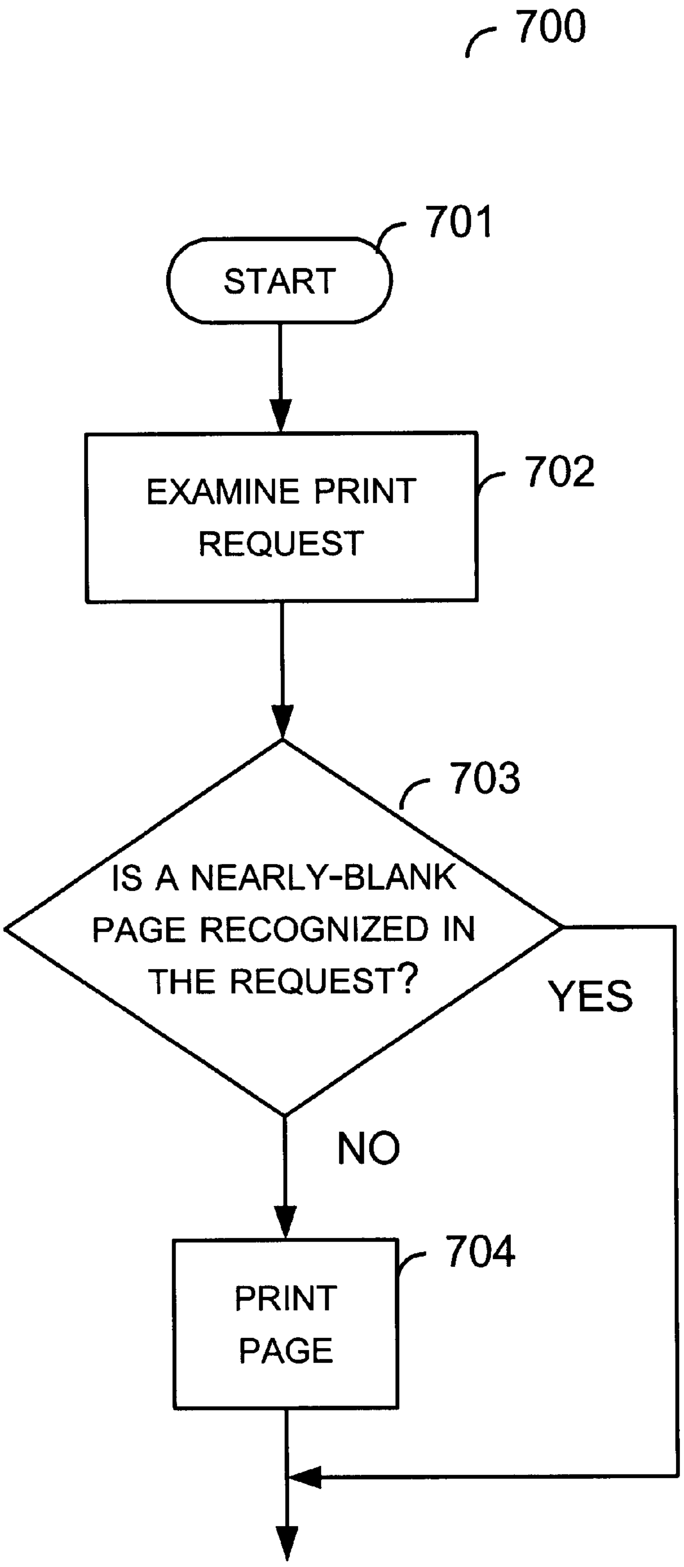
FIG. 7 depicts a flow chart of the steps that an example method embodying the invention may comprise.

FIG. 7 depicts a flow chart of the steps that an example method 700 embodying the invention may comprise. Initiator 701 indicates the beginning of the method. In step 702, a print request is examined to see if it requests a nearly-blank page. Decision block 703 branches the flow of the method depending on whether a nearly-blank page request was recognized. If it was not recognized that a nearly-blank page was requested, then the page is printed in step 704. If a request for a nearly-blank page was recognized, then the method is routed around step 704, thereby skipping or suppressing the printing of a nearly-blank page. The processor, circuitry, or software implementing the method may then proceed to other tasks.

In some cases it may be desirable, for example to preserve proper pagination throughout a document, to suppress nearly-blank pages only at the end of a print job. This modification may be easily incorporated into the example embodiments described above. For example, listing 1 may be modified to add an additional test. An example modification is shown in listing 2 below.

Listing 2.

```
suppress_page_flag = NO
if suppression_mode = ON then
  y_top_boundary=1
  y_bottom_boundary=9
  x_left_boundary=0
  x_right_boundary=7
  near_blank_flag = YES
  for y=y_top_boundary to y_bottom_boundary
    for x=x_left_boundary to x_right_boundary
      if dot(x,y)=MARKED then near_blank_flag=NO
    next x
  next y
  if near_blank_flag=YES and last_page=YES then
    suppress_page_flag=YES
end if
```

In listing 2, suppress_page_flag is set to YES only if near_blank_flag is YES and last_page is YES, indicating that the last page of a print job is being processed. Optionally, this additional test may be enabled by a user of a system, using a software interface, a front panel control, or by other means.

The foregoing description of the present invention has been presented for purposes of illustration and description. It is not intended to be exhaustive or to limit the invention to the precise form disclosed, and other modifications and variations may be possible in light of the above teachings. For example, the data processing system need not comprise separate enclosures for the host device and printer. The data processing system may be a self-contained unit containing an internal printer. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A printer, comprising:

a) means for detecting a request to print a nearly-blank page; and b) means for suppressing the printing of the nearly-blank page; and wherein the means for detecting the request to print the nearly-blank page further comprises:

i) means for identifying a region of interest on the page; and ii) means for detecting the absence of intended markings inside the region of interest and detecting the presence of intended markings outside the region of interest.

2. The printer of claim 1 wherein the region of interest on the page excludes the area of the page where a header would be printed.

3. The printer of claim 1 wherein the region of interest on the page excludes the area of the page where a footer would be printed.

4. The printer of claim 1 wherein the region of interest on the page excludes the area of the page where a header would be printed, and excludes the area of the page where a footer would be printed.

5. A method of suppressing the printing of a nearly-blank page, comprising the steps of:

a) recognizing that a print request requests the printing of the nearly-blank page by i) identifying a region of interest on a page; and ii) designating the page as nearly-blank when all requested markings in the print request are outside the region of interest; and b) suppressing the printing of the nearly-blank page.

6. The method of claim 5 wherein the region of interest on the page excludes the area of the page where a header would be printed.

7. The method of claim 5 wherein the region of interest on the page excludes the area of the page where a footer would be printed.

8. The method of claim 5 wherein the region of interest on the page excludes the area of the page where a header would be printed, and excludes the area of the page where a footer would be printed.

9. A data processing system, comprising:

a) a host device that generates data describing a page to be printed;

b) a printer;

c) an interface that carries the data from the host device to the printer;

d) a processor; and e) a program, executing in the processor, that examines the data and recognizes that the page to be printed is nearly-blank, and suppresses the printing of the page; and wherein recognizing that the page to be printed is nearly-blank comprises the steps of i) identifying a region of interest on the page; and ii) designating the page as nearly-blank when all requested markings on the page are outside the region of interest.

10. The data processing system of claim 9 wherein the processor is in the printer.

11. The data processing system of claim 9 wherein the processor is in the host device.

12. The data processing system of claim 9 wherein the host device is a computer.

13. The data processing system of claim 9 wherein the host device is a set-top box.

* * * * *